B. WEBSTER.
LIQUID TANK INDICATOR.
APPLICATION FILED MAR. 30, 1908.
907,657.
Patented Dec. 22, 1908.
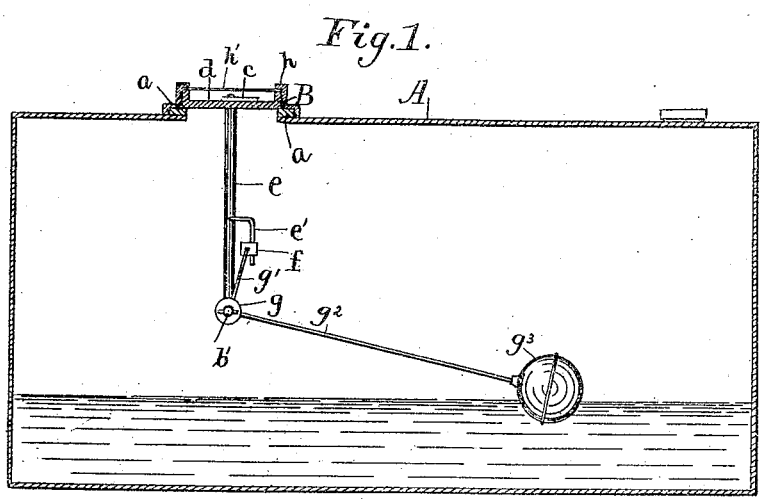
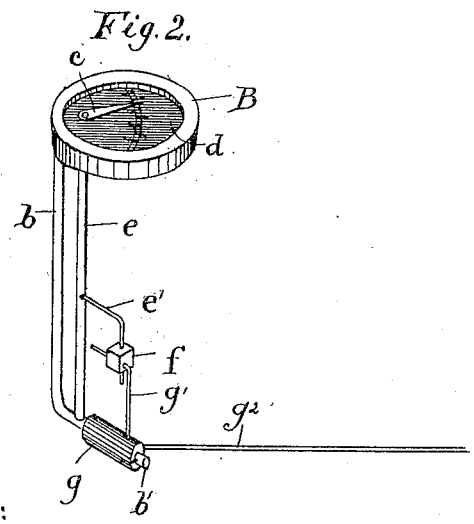

UNITED STATES PATENT OFFICE.

BENJAMIN WEBSTER, OF BOSTON, MASSACHUSETTS, ASSIGNOR TO JOSEPH M. EVERETT, OF BOSTON, MASSACHUSETTS.

LIQUID-TANK INDICATOR.

No. 907,657.     Specification of Letters Patent.     Patented Dec. 22, 1908.

Application filed March 30, 1908. Serial No. 424,044.

*To all whom it may concern:*

Be it known that I, BENJAMIN WEBSTER, a citizen of the United States of America, and a resident of Boston, county of Suffolk, and Commonwealth of Massachusetts, have invented certain new and useful Improvements in Liquid-Tank Indicators, of which the following is a specification.

My invention relates to indicators for closed liquid tanks such as are used in automobiles for carrying gasolene. These indicators are provided with a float which rises and falls with the level of the liquid in the tank and a pointer and dial on the outside of the tank indicate the depth or quantity of liquid in the tank.

In the class of indicators to which my invention particularly relates, the tank is provided with a vertical shaft having a pointer on its upper end wth a float arm and float journaled adjacent to the lower end of the shaft and the object of my invention is to devise means for transmitting the motion of the float arm around its pivot point to the vertical shaft which will be simple and easily made and not liable to get out of order.

The invention consists in the device hereinafter shown and described.

I illustrate my invention by means of the accompanying drawing in which—

Figure 1 is a vertical longitudinal section through a liquid tank showing my indicator in elevation and Fig. 2 is a perspective view of the same.

In the drawing, A represents a closed tank which may be a gasolene tank such as are used in automobiles, power boats etc. My indicator is carried by a fitting B suitably secured in an opening in the top of the tank. As here shown the fitting B rests on a collar $a$ soldered to the top of the tank and this collar has a screw threaded outer edge on which is screwed the clamping ring $h$, this latter having a bearing on the top of the fitting B and serving also to secure in place the crystal $h'$ by which the dial is protected. The fitting B has formed on it a suitable dial $d$ on which is marked a suitable scale or graduation to indicate the depth or quantity of oil.

The quantity of oil in the tank is indicated by a hand or pointer $c$ secured on the upper end of a vertical shaft $e$ which extends up through the dial. The lower end of the shaft $e$ is journaled in a horizontal arm $b'$ formed on the lower end of the supporting hanger $b$ which is secured to the fitting B and acts to support the operating mechanism.

The level of the liquid is ascertained by means of a float $g^3$ on the end of a float arm $g^2$, this arm being secured on a hub $g$ which is journaled adjacent to the lower end of the shaft $e$. As here shown, the hub $g$ is journaled on the horizontal arm $b'$ in which the shaft $e$ is journaled, the shaft and the axis of the hub being at right angles to each other. The motion of the float arm and hub around the journal $b'$ as the float rises and falls is transmitted to the shaft $e$ by means of a block $f$ having a vertical hole and a horizontal pole parallel with the axis of the hub $g$. A kind of universal joint is formed with this block by means of a rod $g'$ secured to the hub and having a horizontal portion passing through the horizontal hole in the block and a rod $e'$ secured to the shaft $e$ and having a vertical portion which passes through the vertical hole in the block. As here shown each of the rods $g'$ and $e'$ are formed of a piece of wire of suitable size and bent at right angles to form ends which are horizontal and vertical respectively and which fit into the holes so that they turn freely in the holes and slide longitudinally thereof. Thus as the hub $g$ turns during the rise and fall of the float, the rotation of the hub is transmitted through the joint formed by the block to the shaft, the position of the shaft as shown by the pointer indicating the position of the float. The operating parts as shown are all attached to the fitting B and can be easily taken out and put into the tank and the connecting joint is simple, easily and cheaply made, not liable to get out of order and it has not lost motion so that the pointer registers with great accuracy.

I claim:—

The herein described indicator for gasolene and other like tanks consisting of a vertical shaft having a pointer on the upper end thereof, a hub journaled adjacent to the lower end of said shaft with a horizontal axis, a float arm and float secured to said hub and means for imparting the rotating motion of said hub to the vertical shaft comprising a block having a vertical hole and a horizontal hole parallel with the axis of said hub, a rod secured to said vertical shaft having a vertical portion extending through said vertical hole and a rod secured to said hub having a horizontal portion extending through said horizontal hole.

In witness whereof I have hereunto set my hand this 26th day of March, 1908.

BENJAMIN WEBSTER.

Witnesses:
JOSEPH M. EVERETT,
S. W. BATES.